United States Patent Office 3,131,100
Patented Apr. 28, 1964

3,131,100
SOLID PROPELLANTS COMPRISING A POLYURE-
THANE AND A COPOLYMER OF A CONJU-
GATED DIENE
Otho D. Ratliff, Jr., McGregor, Tex., assignor to Phillips
Petroleum Company, a corporation of Delaware
No Drawing. Filed Dec. 20, 1957, Ser. No. 704,211
14 Claims. (Cl. 149—19)

This invention relates to solid rocket propellants. In one aspect it relates to solid rocket propellants of the composite type comprising an oxidant and a binder, the latter serving as a fuel. In a further aspect it relates to a method of preparing such solid rocket propellants.

Composite solid rocket propellants, the type of propellants with which this invention is concerned, comprise a solid oxidant and a binder which acts as a fuel. Recently, superior composite solid rocket propellants have been discovered such as those disclosed and claimed in copending application, Serial No. 284,447, filed April 25, 1952, by W. B. Reynolds et al., and in copending application, Serial No. 561,943, filed January 27, 1956, by W. B. Reynolds et al. These solid rocket propellants comprise a major amount of a solid inorganic oxidizing salt which is intimately mixed with a minor amount of a binder comprising a copolymer of a conjugated diene and a vinylidene substituted heterocyclic nitrogen base. In some aspects the subject invention can be considered to be an improvement over these copending applications.

Broadly, the subject invention comprises a solid inorganic oxidizing salt intimately mixed with a binder comprising (1) a copolymer of a conjugated diene and a vinylidene substituted heterocyclic nitrogen base, and (2) a polyurethane. The solid propellants of this invention have desirable ballistic and physical properties which make them especially suitable for use in rocket motors such as that type employed to assist the take-off of aircraft.

Accordingly, an object of this invention is to provide a novel solid rocket propellant. Another object is to provide a solid rocket propellant of the composite type comprising an inorganic oxidizing salt intimately mixed with a binder comprising (1) a copolymer of a conjugated diene and a vinylidene substituted heterocyclic nitrogen base, and (2) a polyurethane. Another object is to provide a method for preparing such propellant. Another object is to provide a novel solid rocket propellant of the composite type having desirable tensile strength, modulus and elongation. Further objects and advantages of this invention will become apparent to those skilled in the art from the following discussion and appended claims.

Oxidants which are applicable in the solid propellant compositions of this invention include ammonium, alkali metal, and alkaline earth metal salts of nitric, perchloric, and chloric acids, and mixtures of these salts. Ammonium nitrate and ammonium perchlorate are the preferred oxidants for use in the solid rocket fuels of this invention; other useful oxidants include sodium nitrate, potassium perchlorate, lithium chlorate, calcium nitrate, barium perchlorate, strontium chlorate, and the like.

In the preparation of the solid rocket propellant compositions, the oxidants are powdered to sizes finer than 200 mesh. The amount of solid oxidant employed is usually a major amount of the total composition and is generally in the range between 85 and 95 percent by weight of the total propellant. If desired, however, a lesser amount of oxidant, e.g., as low as 50 percent by weight, can be employed. One particular advantage of this invention lies in the fact that by employing the novel binder hereinafter described in detail, it is possible to obtain relatively high loadings of oxidant, e.g., up to 95 weight percent without employing conventional solvent mixing techniques.

The novel binder of this invention comprises about 5 to 15 percent by weight of the total propellant, although it can amount to as much as 50 percent by weight where low oxidant level is desired. The final binder will comprise about 50 to 75 parts by weight of the copolymer and about 50 to 25 parts by weight of the polyurethane, based on the total parts of binder.

The copolymers employed as binder constituents are those disclosed in said copending applications of W. B. Reynolds et al.; these copolymers are prepared by the polymerization of a conjugated diene, e.g., 1,3-butadiene, and a vinylidene substituted heterocyclic nitrogen base, e.g., 2-methyl-5-vinylpyridine.

The conjugated dienes employed are those containing from 4 to 10 carbon atoms per molecule and include 1,3-butadiene, isoprene, 2-methyl-1,3-butadiene, 2,3-dimethyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable in the polymeric binders of this invention.

Instead of using a single conjugated diene, a mixture of conjugated dienes can be employed. Thus a mixture of 1,3-butadiene and isoprene can be employed as the conjugated diene portion of the copolymer.

The polymerizable heterocyclic nitrogen bases which are applicable for the production of the polymeric materials are those of the pyridine and quinoline series which are copolymerizable with a conjugated diene and contain one and only one

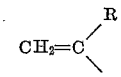

substituent wherein R is either hydrogen or a methyl group. That is, the substituent is either a vinyl or an alpha-methylvinyl (isopropenyl) group. Of these compounds, the pyridine derivatives are of the greatest interest commercially at present. Various substituted derivatives are also applicable but the total number of carbon atoms in the nuclear substituted groups, such as alkyl groups, should not be greater than 12 because the polymerization rate decreases somewhat with increasing size of the alkyl group. Compounds where the alkyl substituents are methyl and/or ethyl are available commercially.

These heterocyclic nitrogen bases have the formula

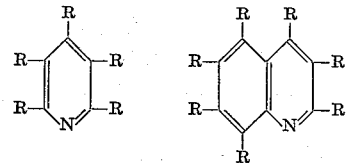

or

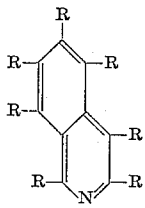

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 12. Examples of such compounds are 2-vinylpyridine;
2-vinyl-5-ethylpyridine;
2-methyl-5-vinylpyridine;
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
2,4-dimethyl-5,6-dipentyl-3-vinylpyridine;
2-decyl-5-(alpha-methylvinyl)pyridine;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl)pyridine;
3-vinyl-5-phenylpyridine;
2-(para-methyl-phenyl)-3-vinyl-4-methylpyridine;
3-vinyl-5-(hydroxyphenyl)pyridine;
2-vinylquinoline;
2-vinyl-4-ethylquinoline;
3-vinyl-6,7-di-n-propylquinoline;
2-methyl-4-nonyl-6-vinylquinoline;
4-(alpha-methylvinyl)-8-dodecylquinoline;
3-vinylisoquinoline;
1,6-dimethyl-3-vinylisoquinoline;
2-vinyl-4-benzylquinoline;
3-vinyl-5-chloroethylquinoline;
3-vinyl-5,6-dichloroisoquinoline;
2-vinyl-6-ethoxy-7-methylquinoline;
3-vinyl-6-hydroxymethylisoquinoline; and the like.

In preparing these copolymers any suitable polymerization method can be employed, preferably emulsion polymerization. In carrying out this polymerization various emulsifying agents, activator or catalyst compositions, modifying agents and the like can be employed and since this polymerizzation is fully and adequately described in said copending applications, the details of the polymerization methods will not be detailed here. The amount of conjugated diene employed in the production of these copolymers is generally in the range of from 25 to 98, preferably from 75 to 95, parts per 100 parts of the total monomeric material and the amount of copolymerizable heterocyclic nitrogen base employed is in the range from 75 to 2, preferably from 25 to 5 parts per 100 parts of the total monomeric material, the proportions of the monomeric material employed depending upon the type of copolymer desired. The preferred copolymer used in this invention is a 90/10 1,3-butadiene/2-methyl-5-vinylpyridine.

According to the subject invention the above described copolymers are blended with organic compounds containing two or more active or labile hydrogens. During this blending operation other compounding ingredients can be added, such as antioxidants, curing agents, and the like. It is also within the scope of this invention to further blend in the binder composition suitable asphaltic material. After the binder constituents have been so blended, the inorganic oxidizing salt is added, preferably in increments from 4 to 6 although more or less can be employed when desired. During this blending step, and preferably near the end thereof, an organic polyisocyanate is added to the resulting blend and mixing is continued for a short time so as to intimately mix the binder components. The organic compounds having two or more active hydrogens serve as plasticizers and when blended with the copolymer material a homogenous mass results. The polyisocyanate reacts with the active hydrogen containing compound causing chain extension and cross linking of the latter to form a polyurethane. Blending is then continued and the propellant composition is generally consolidated in a desirable form or mass in from about 5 to 20 minutes of intimate mixing. The intimately mixed and consolidated propellant composition can then be extruded or molded by compression to form a solid grain which can then be cured at elevated temperatures, e.g., in the range from 150° F. to 250° F. at atmospheric or superatmospheric pressure for a sufficient length of time, e.g., 8 to 60 hours.

Active hydrogen containing compounds which can be incorporated into the binder composition include those which have plasticizing properties and which are known to react with polyisocyanates to form polyurethanes. Compounds which are especially preferred for this purpose are those which contain the —OH and/or —COOH groups, or the precursors of these groups, which are reactive with an isocyanate group —NCO. Compounds employed preferably have two or more of these reactive hydrogen containing groups in the molecule. Commonly the preferred compounds are glycols and esters, including polyglycols and polyesters. Diamines, polyethers and triols can also be employed. Natural products which are particularly useful include castor oil, which comprises a glyceride of ricinoleic acid, and recinoleyl alcohol, and mixture thereof.

Other examples of these active hydrogen containing compounds include alkylene glycols such as ethylene glycol, diethylene glycol, tetraethylene glycol, neopentyl glycol, compounds designated as polyethylene glycol and polypropylene glycol having a molecular weight as high as 10,000 and even higher, propylene glycol, dipropylene glycol, mixed glycols such as the ethylenepropylene glycols, butylene glycol, dibutylene glycol, pentamethylene glycol, ricinoleic alcohol, pentaerythritol [2,2-bis(hydroxymethyl)-1,3-propanediol] and the like. The esters can be made by reaction of dicarboxylic acids with glycols. Generally the hydroxyl-terminated esters are preferred. Acids which can be used in the preparation of these esters include adipic, sebacic, succinic, phthalic and ricinoleic. These acids can be reacted with the above-described glycols to give esters of relatively low (e.g., 200–500) to relatively high (10,000 and even higher) molecular weight. Various methods for the preparation of these esters are known. For example, the acid and glycol can be reacted at an acid to glycol mol ratio between 0.5 and 2 under conditions to promote elimination of the water produced by the reaction. Still another method involves alternate additions of dicarboxylic acid and glycol.

Polyethers which can be used also include Carbitols and Cellosolves. Diamines which can be used include putrescine, cadaverine, ptomaines, ethanolamine, and the like.

The polyisocyanates which are employed can have two or more reactive isocyanate, —NCO, groups but generally isocyanates with two reactive groups are preferred. Examples of these compounds are toluene diisocyanate, ethylene diisocyanate, hexane-1,6-diisocyanate, tolylene-2,4-diisocyanate, tolylene-2,6-diisocyanate, phenyl-4,4'-diisocyanate, 1-methylbenzene-2,4-diisocyanate, benzene-1,3,5-triisocyanate, 2,7 - diphenylsulfone diisocyanate, naphthalene-1,5-diisocyanate, naphthalene-2,7 - diisocyanate, diphenyl-4,4'-diisocyanate, 4,4'-diphenylene methane diisocyanate, dianisidine diisocyanate, 4,4'-tolidine diisocyanate, n-phenylene diisocyanate, 4,4',4''-triisocyanate triphenyl methane, 2,4,6-triisocyanate toluene, 3,3'-dimethyldiphenyl-4-,4'-diisocyanate, 4-methoxy-m-phenylenediisocyanate, 4,4'-diphenyldiisocyanate, 3,3'-dimethoxy-4,4'-diphenyldiisocyanate, 4,4'-methylenediphenylisocyanate, and the like. The amount of polyisocyanate employed will depend on various factors such as the particular active hydrogen containing compound employed, the degree of crosslinking desired, etc., but generally at least a stoichiometric amount will be used, although a lesser amount can be used when it is desired to convert only portions of the active hydrogen containing compound to the polyurethane.

It has been found that some of the active hydrogen containing compounds, notably castor oil, act as plasticizer and when they are milled with the copolymer component it is possible to prepare propellants having a relatively high oxidant content without the necessity of employing solvents to incorporate the higher oxidant levels. In many instances it will be possible to incorporate up to 95 percent oxidant with the highly plasticized binder.

In preparing propellants according to this invention it has been found that the physical properties, such as elongation, tensile strength, and modulus, of these propellants are often superior to similar propellants prepared by solvent mixing techniques employing only the copolymer as the essential binder component. In Table I the composition of a specific propellant prepared by this invention is set forth together with its physical properties; for purposes of comparison, the composition and physical properties of a propellant prepared by solvent mixing techniques are also set forth in Table I.

*Table I*

| Ingredient: | | Propellant of this invention | Comparison propellant |
|---|---|---|---|
| 90/10 butadiene/methylvinylpyridine copolymer | weight percent | 5.69 | 9.25 |
| Philblack A [a] | do | 1.28 | 2.08 |
| Castor oil | do | 2.15 | |
| Flexrecin 15 [b] | do | 2.09 | |
| Nacconate 65 [c] | do | 1.45 | |
| Polygard [d] | do | 0.34 | |
| Philrich 5 [e] | do | | 0.92 |
| Flexamine [f] | do | | 0.28 |
| p-Xylenehexachloride | do | | 0.19 |
| Heptene Base [g] | do | | 0.28 |
| Total binder | do | 13.00 | 13.00 |
| Ammonium perchlorate | do | 75.00 | 75.00 |
| Ammonium nitrate | do | 12.00 | 12.00 |
| Physical properties: | | | |
| After curing @ 190° F.— | | | |
| Elongation: | | | |
| After 12 hrs. cure | percent | 4 | 2 |
| After 24 hrs. cure | do | 4.5 | 2 |
| After 48 hrs. cure | do | 3.4 | 3 |
| After 1 week | do | 4 | 3 |
| Tensile strength: | | | |
| After 12 hrs. cure | per square inch | 200 | 290 |
| After 24 hrs. cure | do | 220 | 200 |
| After 48 hrs. cure | do | 270 | 250 |
| After 1 week | do | 330 | 390 |
| Modulus: | | | |
| After 12 hrs. cure | per square inch | 10,000 | 15,700 |
| After 24 hrs. cure | do | 14,300 | 8,800 |
| After 48 hrs. cure | do | 24,900 | 15,000 |
| After 1 week | do | 13,600 | 22,000 |

[a] A furnace carbon black.
[b] Commercial ricinoleic acid ester.
[c] Commercial toluene diisocyanate.
[d] Tris-nonylphenyl phosphite.
[e] Aromatic rubber extender oil.
[f] A physical mixture containing 25% of a complex diarylamine-ketone reaction product and 35% of N,N'-diphenyl-p-phenylenediamine.
[g] Reaction product of heptaldehyde and aniline.

Further propellant compositions, and physical properties thereof, prepared according to this invention are set forth in Table II; for comparison purposes, other propellants prepared by solvent mixing techniques are also set forth in Table II.

*Table II*

| Ingredients: | | Propellants of this Invention | | | | Comparison Propellant E |
|---|---|---|---|---|---|---|
| | | A | B | C | D | |
| 90/10 butadiene/methylvinylpyridine copolymer | wt. percent | 2.59 | 2.98 | 5.50 | 6.34 | 8.75 |
| Philblack A [a] | do | 0.59 | 0.67 | 1.23 | 1.43 | 1.97 |
| Asphalt [a] | do | 2.59 | 2.98 | | | |
| Castor oil | do | 2.05 | 2.36 | 2.17 | 2.51 | |
| Adol 40 [b] | do | 1.74 | 1.99 | 1.83 | 2.11 | |
| Nacconate 65 | do | 1.41 | 1.62 | 1.50 | 1.73 | |
| Butarez 25 [c] | do | 1.35 | 1.55 | | | 1.76 |
| Polygard | do | 0.72 | 0.84 | 0.77 | 0.88 | |
| Flexamine | do | | | | | 0.26 |
| Total binder | do | 13.00 | 13.00 | 13.00 | 13.00 | 13.00 |
| Ammonium perchlorate | do | 83.00 | 81.09 | 83.00 | 81.09 | 79.00 |
| Ammonium nitrate | do | 4.00 | 3.91 | 4.00 | 3.91 | 8.00 |
| Physical Properties: | | | | | | |
| Elongation— | | | | | | |
| After curing 48 hrs. @ 190° F. (Max. load) | percent | 7 | 5 | 3.6 | 4.0 | 2.7 |
| After curing 48 hrs. @ 190° F. (ultimate load) | percent | | 12 | 9.2 | 10.1 | |
| After oven age 1 wk. @ 190° F. | percent | 5.6 | 5.8 | 2.1 | 2.3 | 1.8 |
| Tensile strength— | | | | | | |
| After curing 48 hrs. @ 190° F. (max. load) | p.s.i. | 37 | 21 | 148 | 90 | 320 |
| After curing 48 hrs. @ 190° F. (ultimate load) | p.s.i. | | 19 | 102 | 69 | |
| After oven age 1 wk. @ 190° F. | p.s.i. | 162 | 113 | 196 | 120 | 360 |
| Modulus— | | | | | | |
| After curing 48 hrs. @ 190° F. (max. load) | p.s.i. | 800 | 600 | 9,200 | 3,900 | 16,000 |
| After oven age 1 wk. @ 190° F. | p.s.i. | 8,107 | 4,934 | 13,090 | 16,000 | 34,000 |

[a] Propane asphalt.
[b] Commercial recinoleyl alcohol.
[c] Commercial liquid polybutadiene.

Various modifications and alterations of this invention will become apparent to those skilled in the art without departing from the scope and spirit of this invention and it is to be understood that the foregoing discussion and examples are preferred embodiments and do not limit this invention.

I claim:
1. A solid propellant of the composite type consisting essentially of 50 to 95 weight percent of oxidant selected from the group consisting of the alkali metal, alkaline earth metal, and ammonia salts of nitric, perchloric, and chloric acids, and 5 to 50 weight percent of a binder consisting essentially of 50 to 25 parts by weight of a polyurethane and 50 to 75 parts by weight of a polymerizable

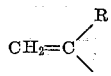

substituted heterocyclic nitrogen base and a copolymerizable conjugated diene having 4 to 10 carbon atoms per molecule, said heterocyclic nitrogen base being selected from the group consisting of those of the pyridine series, those of the quinoline series, and alkyl substituted compounds thereof wherein the total number of carbon atoms in the nuclear alkyl substituents is not greater than 12 and wherein R is selected from the group consisting of hydrogen and a methyl radical, said parts by weight based on the total parts of said binder, wherein said polyurethane is prepared by milling said copolymer with an active hydrogen containing organic compound which is reacted with a polyisocyanate that is added to the propellant composition near the end of the mixing cycle after all of said oxidant is blended with the binder ingredients, said active hydrogen containing organic compound being selected from the group consisting of alkylene glycols, esters of alkylene glycols and dicarboxylic acids, diamines, polyethers, and triols, and wherein said polyisocyanate is selected from the group consisting of toluene diisocyanate, ethylene diisocyanate, hexane-1,6-diisocyanate, tolylene-2,4-diisocyanate, tolylene-2,6-diisocyanate, phenyl-4,4'-diisocyanate, 1-methylbenzene - 2,4 - diisocyanate, benzene-1,3,5 - triisocyanate, 2,7 - diphenylsulfone diisocyanate, naphthalene - 1,5 - diisocyanate, naphthalene-2,7-diisocyanate, diphenyl-4,4'-diisocyanate, 4,4'-diphenylene methane diisocyanate, dianisidine diisocyanate, 4,4'-tolidine diisocyanate, n-phenylene diisocyanate, 4,4',4'-triisocyanate triphenyl methane, 2,4,6-triisocyanate toluene, 3,3'-dimethyldiphenyl - 4,4' - diisocyanate, 4-methoxy-m-phenylenediisocyanate, 4,4' - diphenyldiisocyanate, 3,3' - dimethoxy - 4,4' - diphenyldiisocyanate, and 4,4'-methylenediphenylisocyanate.

2. A solid propellant according to claim 1 wherein said active hydrogen compound is a polyglycol.

3. A solid propellant according to claim 1 wherein said active hydrogen compound is polyester.

4. A solid propellant according to claim 1 wherein said active hydrogen compound is castor oil.

5. A solid propellant according to claim 1 wherein said active hydrogen compound is recinoleyl alcohol.

6. A solid propellant according to claim 1 wherein said polyisocyanate is toluene diisocyanate.

7. A method of preparing a solid propellant of the composite type, comprising milling an active hydrogen containing organic compound with a copolymer of a polymerizable

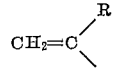

substituted heterocyclic nitrogen base and a copolymerizable conjugated diene having 4 to 10 carbon atoms per molecule, said active hydrogen containing organic compound being selected from the group consisting of alkylene glycols, esters of alkylene glycols and dicarboxylic acids, diamines, polyethers, and triols, said heterocyclic nitrogen base being selected from the group consisting of those of the pyridine series, those of the quinoline series, and alkyl substituted compounds thereof wherein the total number of carbon atoms in the nuclear alkyl substituents is not greater than 12 and wherein R is selected from the group consisting of hydrogen and a methyl radical, blending the resulting mixture with oxidant selected from the group consisting of the alkali metal, alkaline earth metal, and ammonium salts of nitric, perchloric, and chloric acids, and adding a polyisocyanate to the resulting mixture near the end of said blending step in an amount sufficient to convert said active hydrogen containing organic compound to a polyurethane, said oxidant, copolymer, and active hydrogen containing organic compound being employed in amounts sufficient to provide a propellant comprising 50 to 95 weight percent oxidant and 5 to 50 weight percent binder comprising 50 to 75 parts by weight of said copolymer and 50 to 25 parts by weight of said polyurethane, and wherein said polyisocyanate is selected from the group consisting of toluene diisocyanate, ethylene diisocyanate, hexane-1,6-diisocyanate, tolylene-2,4-diisocyanate, tolylene-2,6-diisocyanate, phenyl-4,4'-diisocyanate, 1-methylbenzene-2,4-diisocyanate, benzene - 1,3,5 - triisocyanate, 2,7-diphenylsulfone diisocyanate, naphthalene-1,5-diisocyanate, naphthalene-2,7-diisocyanate, diphenyl-4,4'-diisocyanate, 4,4'-diphenylene methane diisocyanate, dianisidine diisocyanate, 4,4'-tolidine diisocyanate, n-phenylene diisocyanate, 4,4',4' - triisocyanate triphenyl methane, 2,4,6-triisocyanate toluene, 3,3'-dimethyldiphenyl-4,4'-diisocyanate, 4-methoxy-m-phenylenediisocyanate, 4,4'-diphenyldiisocyanate, 3,3'-dimethoxy-4,4'-diphenyldiisocyanate, and 4,4'-methylenediphenylisocyanate.

8. A method according to claim 7 wherein said active hydrogen containing organic compound is castor oil.

9. A method according to claim 7 wherein said oxidant is ammonium nitrate.

10. A method according to claim 7 wherein said oxidant is ammonium perchlorate.

11. A method according to claim 7 wherein said copolymer is butadient/methylvinylpyridine, said active hydrogen containing compound is castor oil, and said polyisocyanate is toluene diisocyanate.

12. A method according to claim 7 wherein said copolymer is butadiene/methylvinylpyridine, said active hydrogen containing compound is recinoleyl alcohol, and said polyisocyanate is toluene diisocyanate.

13. A solid propellant of the composite type consisting essentially of 85 to 95 weight percent of an oxidant consisting essentially of ammonium nitrate and ammonium perchlorate, and 5 to 15 weight percent of a binder consisting essentially of 50 to 75 parts by weight of a copolymer of 1,3-butadiene and 2-methyl-5-vinylpyridine and 50 to 25 parts by weight of a polyurethane formed by reacting castor oil with toluene diisocyanate, said parts by weight based on the total parts of said binder.

14. A method of preparing a solid propellant of the composite type, said method comprising milling castor oil with a copolymer of 1,3-butadiene and 2-methyl-5-vinylpyridine, blending the resulting mixture with oxidant consisting essentially of ammonium nitrate and ammonium perchlorate, and adding toluene diisocyanate to the resulting mixture near the end of said blending step in an amount sufficient to convert said castor oil to a polyurethane, said oxidant, copolymer, and castor oil being employed in amounts sufficient to provide a propellant comprising 85 to 95 weight percent oxidant and 5 to 15 weight percent binder comprising 50 to 75 parts by weight of said copolymer and 50 to 20 parts by weight of said polyurethane, said parts by weight based on the total parts of said binder.

References Cited in the file of this patent
UNITED STATES PATENTS 2,877,504    Fox _____ Mar. 17, 1959

(Other references on following page)

FOREIGN PATENTS 655,585  Great Britain _____ July 25, 1951

OTHER REFERENCES

Chemical and Engineering News, October 7, 1957, pp. 62–3.

Zaehringer: Modern Plastics, vol. 34, October 1956, pp. 148–51.

"Jet Propulsion," Air Technical Service Command, 1946, p. 158. Prepared by Aeronautical Lab. and The Jet Propulsion Laboratory, Galcit, Calif. Inst. of Technology, Downgraded to Unclassified by Authority WCLPN–2, April 23, 1954.

Arendale: Industrial and Engineering Chemistry, vol. 48, No. 4, April 1956, pp. 725–6.

UNITED STATES PATENT OFFICE
CERTIFICATE OF CORRECTION

Patent No. 3,131,100                            April 28, 1964

Otho D. Ratliff, Jr.

It is hereby certified that error appears in the above numbered patent requiring correction and that the said Letters Patent should read as corrected below.

Column 8, line 40, for "butadient" read -- butadiene --; line 67, for "20" read -- 25 --.

Signed and sealed this 20th day of October 1964.

(SEAL)
Attest:

ERNEST W. SWIDER
Attesting Officer

EDWARD J. BRENNER
Commissioner of Patents